July 14, 1953  L. W. THOMPSON  2,645,320
QUICK-CHANGE CLUTCH DISK
Filed April 2, 1951
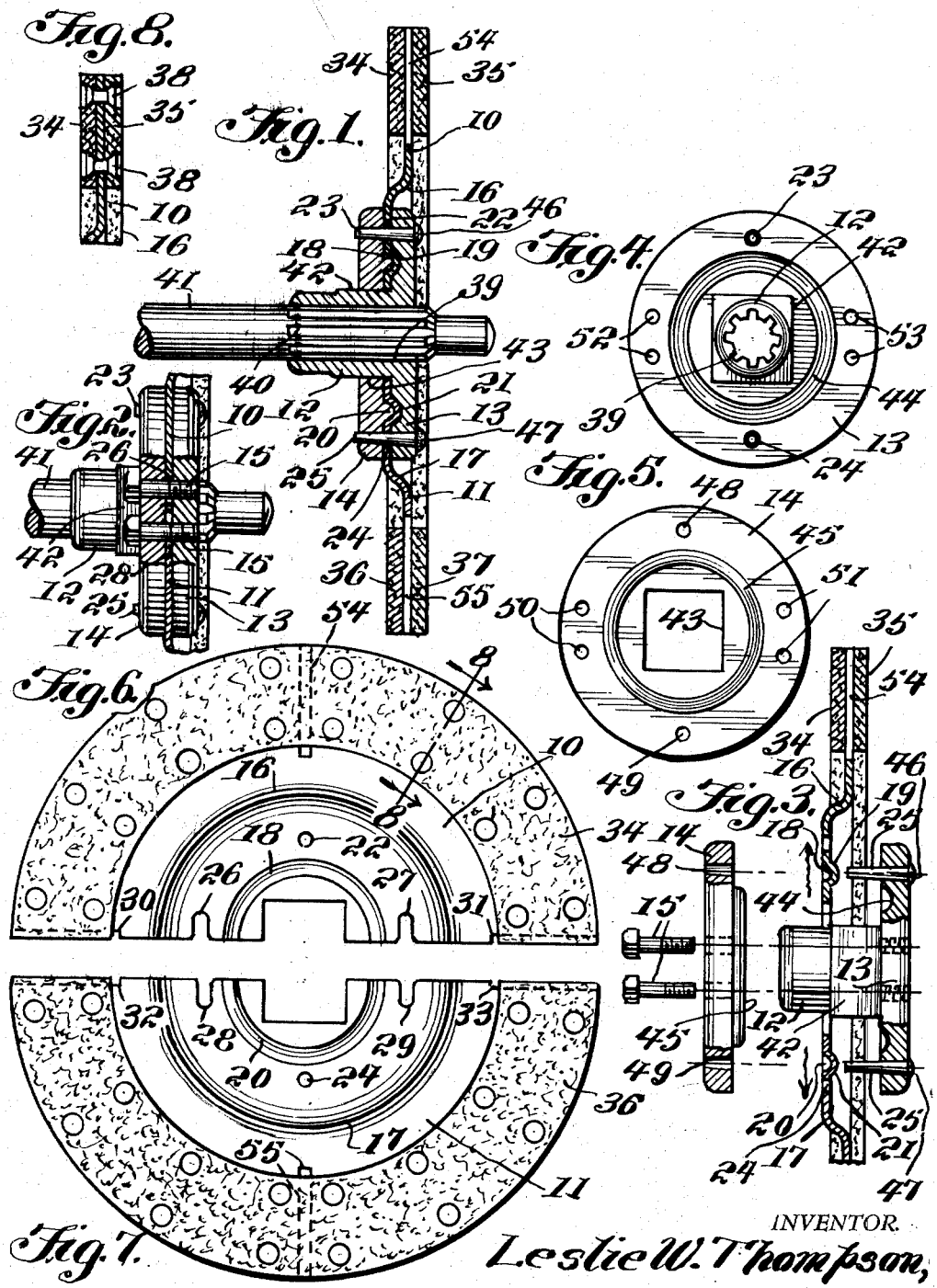
INVENTOR.
Leslie W. Thompson,
BY Victor J. Evans & Co.
ATTORNEYS Patented July 14, 1953

2,645,320

UNITED STATES PATENT OFFICE 2,645,320

QUICK-CHANGE CLUTCH DISK

Leslie W. Thompson, Louisville, Ky.

Application April 2, 1951, Serial No. 218,743

5 Claims. (Cl. 192—107)

This invention relates to improved mountings for clutch discs on clutch shafts whereby a clutch disc is mounted so that the lining may readily be removed and replaced and in particular this invention relates to a clutch disc having an offset inner section by which the disc is clamped between a flange on a hub splined to the clutch shaft and a flange bolted to the flange of the hub.

The purpose of this invention is to provide means for mounting a clutch disc on a clutch shaft so that the clutch disc may readily be removed and replaced.

In the conventional type of clutch the disc is formed integral with the mounting elements and it is difficult to remove the disc when it is desired to repair the clutch facing or lining. With this thought in mind this invention contemplates a clutch disc that is split and clamped between two flanges and with one flange splined to the clutch shaft the other flange may readily be removed when it is desired to remove the sections of the disc.

Furthermore in replacing clutch discs in the conventional mounting it is difficult to align the disc with the axis or center of the shaft. For this reason the clutch disc of this invention is formed with an annular indentation concentric with the center and the indentation, which provides a bead on the opposite side, provides positioning means whereby with corresponding beads and indentations in the mounting flanges the clutch disc is readily positioned as it is replaced and may be positively clamped in position without the necessity of aligning the parts in the assembling operation.

The object of this invention is, therefore, to provide an improved mounting for a clutch disc whereby by removing cap screws the flange clamping the clutch disc to a flange of a hub splined on the clutch shaft is readily removed whereby the clutch disc is free and may also be readily removed.

In addition, it is difficult to remove a conventional clutch disc without separating parts of the clutch or providing means for moving the shaft and associated parts longitudinally in the clutch housing. With this thought in mind this invention further contemplates providing a split disc whereby with the clutch parts free as a flange is separated from a flange on a hub on the clutch shaft the two semi-circular sections of the clutch disc are readily removable without separating the clutch parts longitudinally.

Another object of this invention is, therefore, to provide means for positively mounting split sections of a clutch disc on a clutch shaft whereby the parts function as an integral unit.

A further object of the invention is to provide an improved clutch disc and mounting therefor which is of a simple and economical construction.

With these and other objects and advantages in view the invention embodies a clutch disc formed of two semi-circular sections with clutch linings on the peripheral surfaces and with annular indentations therein whereby the clutch parts are readily clamped between flanges of a mounting hub.

Other features and advantages of the invention will appear from the following description taken in connection with the drawings wherein:

Figure 1 is a longitudinal section through the clutch disc and mounting hub with the shaft on which the parts are mounted shown in elevation.

Figure 2 is a side elevational view of the clutch disc mounting hub with parts broken away showing cap screws extended through flanges of the hub.

Figure 3 is an exploded longitudinally disposed section, similar to that shown in Figure 1 illustrating the parts in separated positions and with parts shown in elevation.

Figure 4 is an end elevational view showing the improved clutch disc mounting hub with the flange mounted on one end thereof.

Figure 5 is a similar view showing the removable flange formed to be mounted on the hub.

Figure 6 is an elevational view showing the clutch disc with the clutch lining mounted thereon and illustrating the upper section of the disc.

Figure 7 is a similar view showing the lower section of the disc.

Figure 8 is a cross section taken on line 8—8 of Figure 6 illustrating the method of riveting the clutch linings to the sides of the disc.

Referring now to the drawings wherein like reference characters denote corresponding parts the improved clutch disc of this invention includes a pair of semi-circular sections 10 and 11, a hub 12 having a flange 13 thereon, and a flange 14 that is bolted to the flange 13 by cap screws 15 which are arranged in pairs in the opposite sides of the clutch.

The section 10 of the clutch is formed with an offset 16 and a similar offset 17 is provided in the section 11. The section 10 is also provided with an indentation 18 that forms a bead 19 on the opposite side and the section 11 is provided with a similar indentation 20 that provides a bead 21 on the opposite side.

The section 10 is also provided with an opening 22 for a dowel pin 23 and a similar opening 24 is provided in sections 11 for receiving the dowel pin 25. The section 10 is provided with notches 26 and 27 through which the cap screws extend and similar notches 28 and 29 are provided in the section 11.

The meeting edges of the sections 10 and 11 are also provided with offset sections, the section 10 having offset sections 30 and 31 and section 11 having similar offset sections 32 and 33.

The lining or facing strips 34 and 35 on the section 10 and 36 and 37 on the section 11 are secured in position by rivets 38.

The hub 12 is provided with a splined bore 39 and the splines are positioned to coact with similar splines 40 on a clutch shaft 41.

The hub 12 is provided with a square shoulder 42 and a similar opening 43 is provided in the flange 14 whereby the flange is retained in position on the hub.

The flange 13 of the hub 12 is also provided with an annular recess 44 that is positioned to receive the beads 19 and 21 on the clutch sections, and the flange 14 is provided with a registering annular bead 45 that extends into the annular recesses 18 and 20 of the clutch sections 10 and 11, respectively.

The tapering dowel pins 23 and 25 are mounted, preferably by welding, as indicated at the points 46 and 47 in the flange 13 and the flange 14 is provided with openings 48 and 49 that are positioned to receive the pins.

The flange 14 is provided with pairs of openings as indicated by the numeral 50 on one side and 51 on the other for receiving the cap screws 15 and similar threaded openings 52 and 53 are provided in the flange 13.

With the parts arranged in this manner the clutch disc sections are assembled on the hub with the beads 19 and 21 clamped into the annular recess 44 of the flange 13 by the beads 19 and 20 by the beads 45 of the flange 14 and the parts are held in assembled relation by the cap screws 15.

With the parts arranged in this manner the clutch disc sections may readily be removed and replaced in order to repair the lining.

The clutch disc sections 10 and 11 are provided with radially disposed slots, as indicated by the numerals 54 and 55 which are positioned to compensate for expansion in the plates. These slots may be located at suitable points as may be desired.

It will be understood that modifications may be made in the design and arrangement of the parts without departing from the spirit of the invention.

What is claimed is:

1. A clutch disc assembly comprising two semi-circular sections, each having an offset centrally disposed portion and an arcuate mounting rib in said centrally disposed portion, lining strips on the peripheral edges of the said sections, each of said sections having a recess in the center, a mounting hub having a shoulder and a flange thereon and said flange having an annular recess positioned to receive the arcuate ribs of the said clutch sections, a mounting flange having a centrally positioned opening therein for receiving the shoulder of the hub and having an annular bead on one face positioned to register with the recess of the flange of the hub for positioning the said clutch disc sections on the hub, and means securing the said mounting flange to the flange of the hub for clamping the said clutch disc sections on the hub.

2. A clutch disc assembly comprising two semi-circular sections, each having an offset centrally disposed portion and an arcuate mounting rib in said centrally disposed portion, lining strips on the peripheral edges of the said sections, each of said sections having a rectangular shaped recess in the center, a mounting hub having a square shoulder and a flange thereon and said flange having an annular recess positioned to receive the arcuate ribs of the said clutch sections, a mounting flange having a square centrally positioned opening therein for receiving the square shoulder of the hub and having an annular bead on one face positioned to register with the recess of the flange of the hub for positioning the said clutch disc sections on the hub, and means securing the said mounting flange to the flange of the hub for clamping the said clutch disc sections on the hub.

3. A clutch disc assembly comprising two semi-circular sections, each having an offset centrally disposed portion and an arcuate mounting rib in said centrally disposed portion, lining strips on the peripheral edges of the said sections, each of said sections having a rectangular shaped recess in the center, a mounting hub having a square shoulder and a flange thereon and said flange having an annular recess positioned to receive the arcuate ribs of the said clutch sections, a mounting flange having a square centrally positioned opening therein for receiving the square shoulder of the hub and having an annular bead on one face positioned to register with the recess of the flange of the hub for positioning the said clutch disc sections on the hub, said mounting flange having dowel pin receiving openings therein, and dowel pins carried by the flange of the hub positioned to register with the dowel pin openings of the mounting flange for positioning the mounting flange in relation to the flange of the hub, and cap screws extended through the mounting flange and threaded into the flange of the hub for securing the parts in assembled relation.

4. In a clutch disc and mounting therefor, the combination which comprises two semi-circular sections, each having an offset centrally disposed portion and an arcuate indentation in one surface providing a corresponding rib on the opposite surface, means for mounting lining strips on the peripheral edges of said sections and each section having a rectangular shaped recess in the center, a mounting hub having a splined bore for receiving a clutch shaft and having a square shoulder on the outer surface with a flange extended from one end, said flange having an annular recess therein positioned to receive the arcuate ribs of the disc sections, said flange of the hub also having tapering pins extended from the surface thereof adjacent the said square shoulder, a mounting flange having a square centrally positioned opening therein for receiving the square shoulder of the hub, having an annular bead on one face positioned to register with the arcuate indentations of the disc sections and having openings therein positioned to receive the tapering pins of the flange of the hub and means securing the mounting flange to the flange of the hub with the said disc sections clamped therebetween.

5. In a clutch disc and mounting therefor, the combination which comprises two semi-circular sections, each having an offset centrally disposed portion and an arcuate indentation in one surface providing a corresponding rib on the opposite surface, means for mounting lining strips on the peripheral edges of said sections and each section having a rectangular shaped recess in the center, a mounting hub having a splined bore for receiving a clutch shaft and having a square shoulder on the outer surface with a flange extended from one end, said flange having an annular recess therein positioned to receive the arcuate ribs of the disc sections, said flange of the hub also having tapering pins extended from the surface thereof adjacent the said square shoulder, a mounting flange having a square centrally positioned opening therein for receiving the square shoulder of the hub, having an annular bead on one face positioned to register with the arcuate indentations of the disc sections and having openings therein positioned to receive the tapering pins of the flange of the hub, and cap screws extended through the mounting flange and threaded into the flange of the hub for securing the mounting flange in the flange of the hub with the disc section clamped therebetween, said cap screws positioned in spaced relation and with one screw in each end of each of the said disc sections.

LESLIE W. THOMPSON.

References Cited in the file of this patent

UNITED STATES PATENTS

| Number | Name | Date |
| --- | --- | --- |
| 1,888,779 | Tower | Nov. 22, 1932 |
| 1,913,802 | Gregory | June 13, 1933 |
| 2,015,890 | Gattschalk | Oct. 1, 1935 |
| 2,053,849 | Spase | Sept. 8, 1936 |
| 2,567,125 | Ruch | Sept. 4, 1951 |